US008605667B2

(12) United States Patent
Rajasekar et al.

(10) Patent No.: US 8,605,667 B2
(45) Date of Patent: Dec. 10, 2013

(54) SYSTEMS AND METHODS FOR EXPOSING DIFFERENT SERVICE FACADES OF AN UNDERLYING NETWORK

(75) Inventors: Sharath Rajasekar, San Francisco, CA (US); Phelim O'Doherty, San Francisco, CA (US); Boris Selitser, Castro Valley, CA (US); Elaine Peng, San Francisco, CA (US); Jean Bovet, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 13/006,153

(22) Filed: Jan. 13, 2011

(65) Prior Publication Data

US 2011/0170505 A1   Jul. 14, 2011

Related U.S. Application Data

(60) Provisional application No. 61/294,766, filed on Jan. 13, 2010.

(51) Int. Cl.
*H04W 4/00* (2009.01)

(52) U.S. Cl.
USPC ........................................................ 370/329

(58) Field of Classification Search
USPC ................. 370/259–261, 328–339, 351–355, 370/395.5–395.52, 400–401; 709/205, 223, 709/249
See application file for complete search history.

(56) References Cited

U.S. PATENT DOCUMENTS

| 6,760,417 | B1 | 7/2004 | Wallenius | |
| 7,136,913 | B2* | 11/2006 | Linderman | 709/223 |
| 7,483,438 | B2* | 1/2009 | Serghi et al. | 370/401 |
| 8,296,409 | B2* | 10/2012 | Banerjee et al. | 709/223 |
| 2002/0025795 | A1 | 2/2002 | Sharon et al. | |
| 2003/0028790 | A1 | 2/2003 | Bleumer et al. | |
| 2004/0009762 | A1 | 1/2004 | Bugiu et al. | |
| 2005/0245230 | A1 | 11/2005 | Benco et al. | |
| 2007/0106801 | A1 | 5/2007 | Jansson | |
| 2007/0143470 | A1 | 6/2007 | Sylvain | |
| 2008/0103923 | A1 | 5/2008 | Rieck et al. | |
| 2009/0268715 | A1* | 10/2009 | Jansson | 370/352 |
| 2011/0082920 | A1* | 4/2011 | Bhattacharya et al. | 709/221 |

OTHER PUBLICATIONS

BEA, WebLogic Network Gatekeeper, Architectural Overview, Version 3.0, 112 pages, Sep. 2007.*
Chen et al, Applying SOA and Web 2.0 to Telecom: Legacy and IMS Next-Generation Architectures, IEEE, 6 pages, 2008.*
Oracle Communication Services Gatekeeper Concepts and Architectural Overview, Release 4.1, Oracle, 94 pages, Jan. 2009.*

\* cited by examiner

*Primary Examiner* — Frank Duong
(74) *Attorney, Agent, or Firm* — Fliesler Meyer LLP

(57) ABSTRACT

A plurality of service facades are used to expose the capabilities of an underlying telecommunications network in different ways. Each service façade provides a different interface to access a set of functions of the telecom network. The service facades can be accessed by client applications residing externally with respect to the telecom network. The client applications can invoke a particular service façade to send a message to the network and the invocations can be translated to the native protocols used by the resources in the telecom network to carry out the request. The service facades can be deployed on a service access gateway to the telecom network and can include a simple object access protocol (SOAP) façade, a representational state transfer (REST) façade, a service oriented architecture (SOA) façade and a native façade.

19 Claims, 9 Drawing Sheets

SYSTEMS AND METHODS FOR EXPOSING DIFFERENT SERVICE FACADES OF AN UNDERLYING NETWORK

CLAIM OF PRIORITY

The present application claims the benefit of U.S. Provisional Patent Application No. 61/294,766, entitled "GATEKEEPER SERVICE EXPOSURE PLATFORM FOR MOBILE COMMUNICATIONS," by Sharath Rajasekar et al., filed on Jan. 13, 2010, which is incorporated by reference herein in its entirety, including all Appendices filed therewith.

CROSS-REFERENCE TO RELATED APPLICATIONS

This application is related to the following co-pending applications:

U.S. patent application No. 13/006,172, entitled SYSTEMS AND METHODS FOR INTEGRATING A SERVICE ACCESS GATEWAY WITH BILLING AND REVENUE MANAGEMENT SYSTEMS, by Rajasekar et al., filed Jan. 13, 2011; and U.S. patent application No. 13/006,184 entitled GATEWAY FOR ENABLING CLOUD-BASED SERVICE EXPOSURE, by Rajasekar et al., filed Jan. 13, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and gateways for managing access to a wireless network.

BACKGROUND

With the advent of mobile communications, more and more devices are becoming integrated with the World Wide Web. Everything from a simple cellular phone to more complex mobile devices such as laptops, electronic books, tablets, personal digital assistants (PDAs) and even automobiles are striving to maintain a constant connection to the internet. As a result of all this interconnectivity, websites and other online application providers have been showing an ever increasing interest in providing services to these mobile clients.

For mobile network operators (MNOs) that own the network and access to the mobile subscriber, onboarding all of these third party service providers has not proved to be easy. A multitude of issues and problems may arise when managing large numbers of applications attempting to access the network. These issues include security control, traffic throttling, providing more options and control to the subscriber, as well as translation of communications between various protocols being employed.

In light of these concerns, many network operators have deployed service access gateways or other intermediary entities in order to manage and control the communications exchanged between the various entities and their mobile subscribers. However, these gateway solutions have not addressed all the problems and various shortcomings still exist in the marketplace.

By way of example, different service providers that wish to provide services to the telecom network often need to access it in different formats (i.e. each provider using different protocols, APIs, communications, data, synchronous/asynchronous communications, etc.). The approach to provide such access has generally been either ad hoc-based (each type of service provider connecting to the network by learning how to integrate itself and to access the capabilities exposed) or by providing a generalized interface (web services) for accessing the network capabilities. However, this approach has a number of limitations. For example, the process of learning how to access the underlying network and how to integrate its functionality and services can be a cumbersome and tedious task, involving significant time and costs on the part of the service provider. On the other hand, merely providing a simplified generic interface for all service providers may not be as all-inclusive of certain functionalities and capabilities that can be desirable to a select few providers. What is needed is a simplified way for client applications to access the underlying network and take advantage of all of its needed capabilities in a multitude of formats which can be selectable by the client and one that allows developers to use more familiar functionality and interfaces.

BRIEF SUMMARY OF THE INVENTION

A plurality of service facades are used to expose the capabilities of an underlying telecommunications network in different ways. Each service façade provides a different interface to access a set of functions of the telecom network. The service facades can be accessed by client applications residing externally with respect to the telecom network. The client applications can invoke a particular service façade to send a message to the network and the invocations can be translated to the native protocols used by the resources in the telecom network to carry out the request. The service facades can be deployed on a service access gateway to the telecom network and can include a simple object access protocol (SOAP) façade, a representational state transfer (REST) façade, a service oriented architecture (SOA) façade and a native façade.

DETAILED DESCRIPTION

Figure 1:
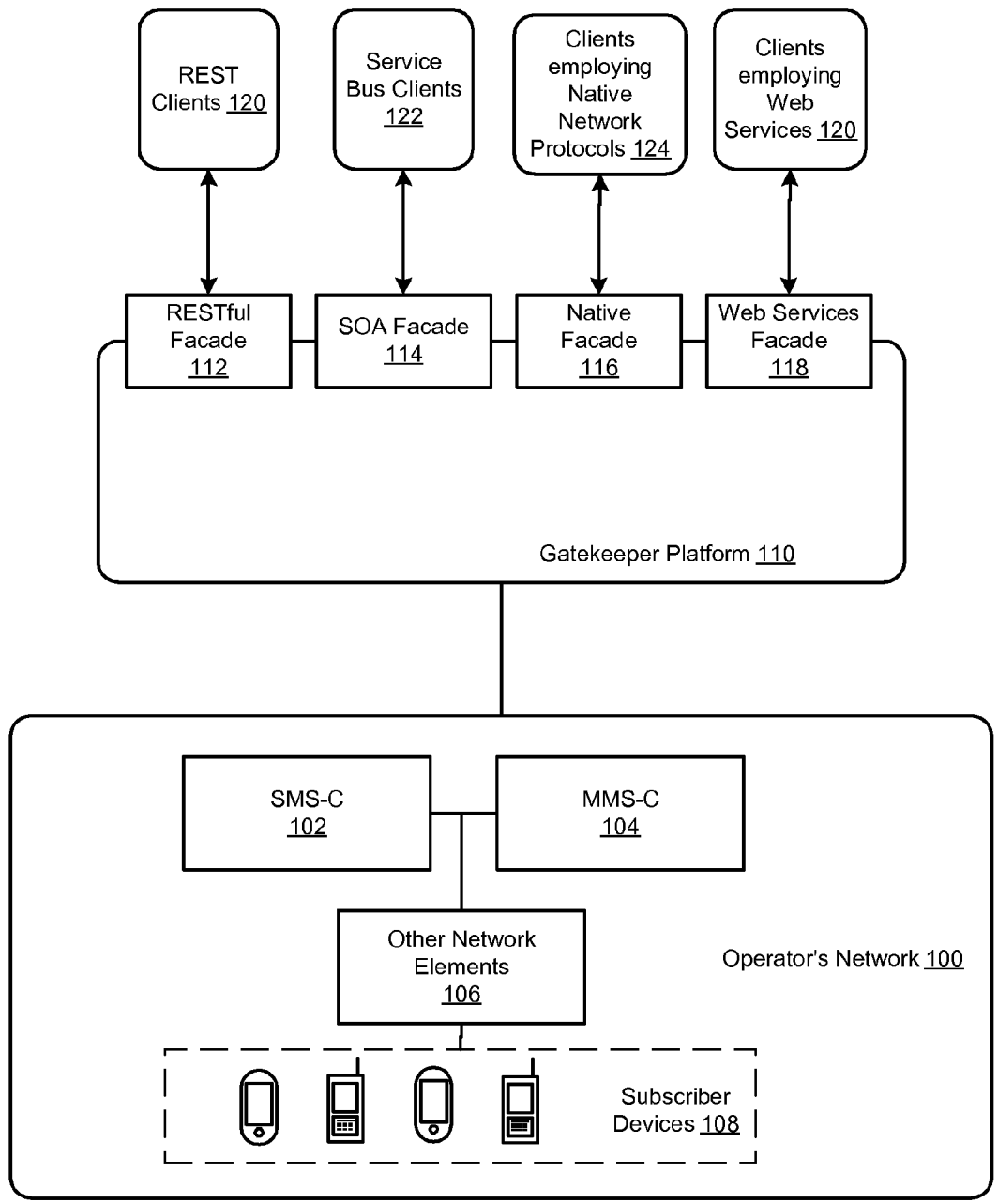
FIG. 1 is a functional illustration of the service facades implemented in the gatekeeper platform, in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

The embodiments of the present invention can be utilized within a service exposure gatekeeper platform that is positioned to manage access to a wireless telecommunications network (e.g. cellular telephone network, such as GSM or CDMA network). In accordance with an embodiment, the gatekeeper is a service access gateway that can intercept and manage communications between the mobile devices in the wireless network and the various third party service providers, such as client web applications residing on the Internet. For example, the gatekeeper can intercept both network-initiated communications and application-initiated communications and apply service level agreements (SLAs), security, traffic throttling, protocol translation and other functionality to those communications. In accordance with one embodiment, the gatekeeper is implemented as a web application that is deployed by a network operator.

In accordance with various embodiments, the gatekeeper includes a set of features to add and improve functionality to manage the mobile communications flowing to and from the mobile network. In accordance with an embodiment, the gatekeeper includes a set of service facades that expose differing views of the underlying wireless network depending on the client accessing the façade. This enables the gatekeeper to expose differing views (facades) of the underlying telecom network infrastructure to different audiences. For example, one type of service provider client may see one façade of the network based on its native way of communicating (or based on a particular standard), while another type of service provider would see a different façade of the same network capabilities. In accordance with an embodiment, the gatekeeper exposes a REpresentational State Transfer (RESTful) style façade, a SOAP style facade based on Parlay X 2.1 and 3.0, a Service Oriented Architecture (SOA) based façade that leverages an enterprise service bus, and a Native facade based on native telecom network protocols. Because the gatekeeper platform is positioned at the entrance to the operator's telecom network, it can leverage these facades in order to expose multiple different views of the telecom network depending on who is accessing it and depending on the protocol that the assessor is using to communicate.

In accordance with an embodiment, REST style web services are usually lighter weight and particularly useful for rich internet applications (e.g. AJAX) and limited profile devices. As such, these lightweight devices can utilize the REST view of the network by accessing the RESTful façade provided by the gatekeeper platform. On the other hand, generic web applications that communicate via Web Services can utilize the SOAP view of the network by accessing the Web Services/SOAP façade. Legacy clients that communicate by the native network protocols can continue to access the network in the same manner by accessing the Native façade of the gatekeeper. Similarly, applications that utilize an enterprise service bus can use the SOA facade of the gatekeeper.

One advantage of using such facades is that different service providers do not need to learn how to integrate themselves with one type of interface exposed by the network. Instead, each service provider application can use its own specific view (façade) of the network capabilities. This is also a value that is added by the platform to any network operator seeking to make access to its network easier for various third party services.

In accordance with an embodiment, the different service facades can be switched at runtime, without any coding on the part of the users using the façade. Upon swapping one façade for another, the gatekeeper maintains access to the network for the application and continues to allow the application to access its capabilities over the new façade.

FIG. 1 is a functional illustration of the service facades implemented in the gatekeeper platform, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the gatekeeper platform 110 exposes a number of different facades of the underlying network 100 capabilities. In accordance with an embodiment, these facades include a RESTful facade 112, a SOA façade 114, a Native façade 116 and a Web Services (SOAP) façade 118. Each of these service facades can be accessed by a respective client (120, 122, 124, 128) that knows how to interact and access the functions exposed by the particular façade. By interacting with the service façades, the clients can access the various network elements, such as short messaging service center (SMS-C) 102, multimedia messaging center (MMS-C) 104 and others 106, in order to provide a particular service to a subscriber of a mobile device 108 in the network.

Figure 2:
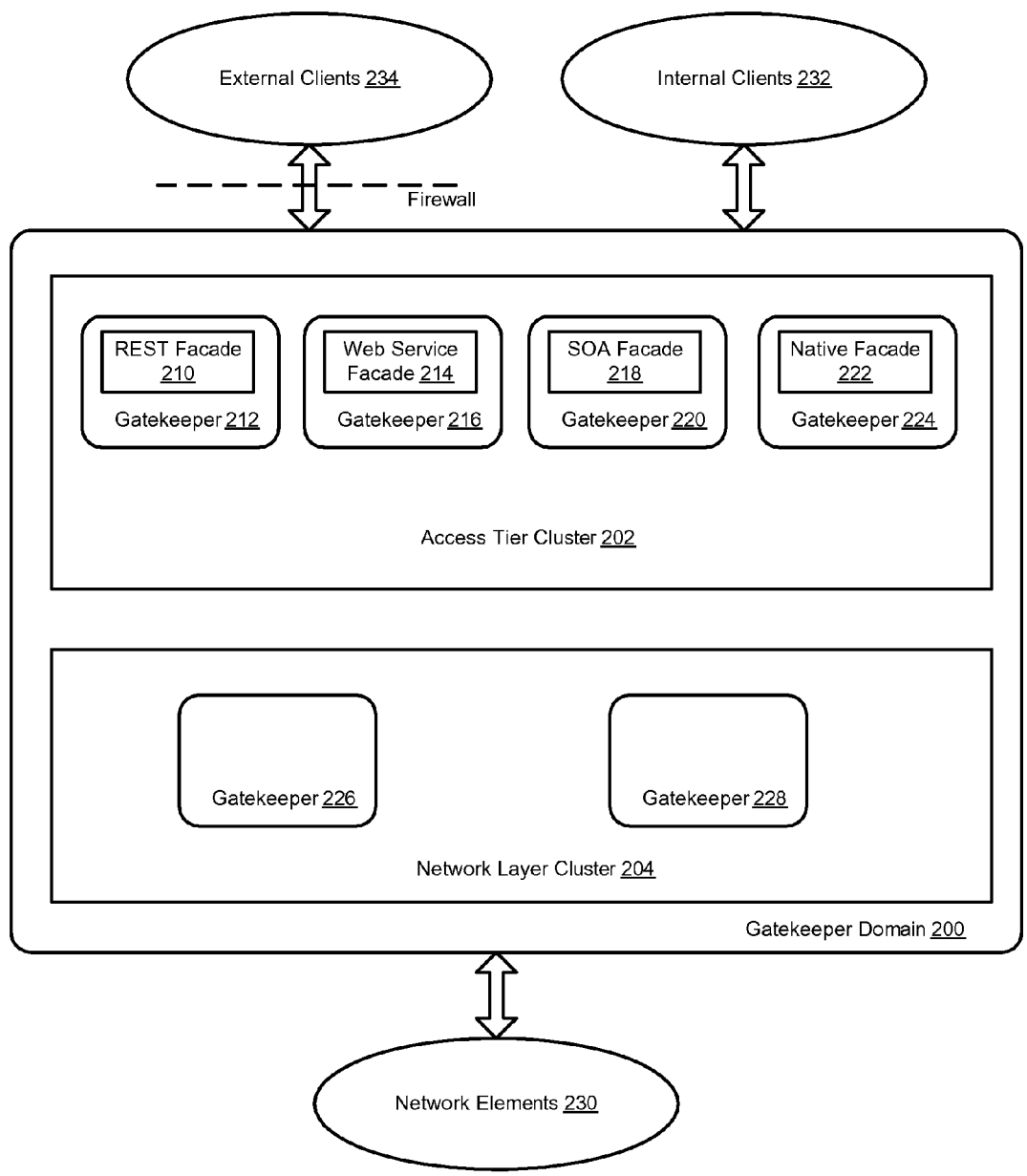
FIG. 2 is another illustration of the service facades implemented in the gatekeeper platform, in accordance with various embodiments of the invention.

FIG. 2 is another illustration of the service facades implemented in the gatekeeper platform, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As shown in this figure, the gatekeeper 200 can be deployed in a dual type of tier deployment that includes an access layer cluster 202 and a network layer cluster 204. Each cluster can include one or more gatekeeper node instances. The network layer cluster can contain the various plugins to interact with the underlying network elements 230 in their respective protocols, while the access layer cluster can interact with the various internal and external clients 232, 234 that wish to access the network in order to provide a particular service to the mobile subscriber devices. In accordance with various embodiments, the service facades 210, 214, 218, 222 are implemented in the access tier cluster for both internal and external exposure.

In accordance with an embodiment, the tier routing feature can enable a single network tier to support multiple service facades (multiple access tiers). For example, when different clients access the gatekeeper by using different facades, the gatekeeper may often need to send acknowledgements, responses or notifications back to the client. In many instances it is important to determine which service facade was used to originally receive the request to the gatekeeper. This can be important since the gatekeeper platform may need to know which service façade the client is connected to. In accordance with an embodiment, the tier routing feature can provide the logic to determine which service façade was originally invoked to provide the request to the gatekeeper. This can be performed by allowing multiple access tiers of the gatekeeper 212, 216, 220, 224 to access the same network tier.

In accordance with various embodiments, several facades are described in more detail with reference to the figures below. It is noted, however, that the specific facades described below are not intended to limit all of the embodiments of the invention but are rather shown only for purposes of illustration on some of the possible options for facades that can be created to expose the capabilities of the telecom network. It will be apparent to one of ordinary skill in the art, that many other such facades are possible and can be created within the scope of the embodiments of the invention described herein.

REST Façade

In general, REST style web services are lighter weight than SOAP based web services and are particularly useful for Rich Internet Applications (e.g. Ajax) and limited profile devices. In accordance with an embodiment, the REST facade is a set of REST style web service implementations for Parlay X and extended web services (EWS) communication services. In accordance with an embodiment, it is comprised of an additional library of components to be deployed on the access tier of the gatekeeper for each communication service to handle REST based requests.

In accordance with an embodiment, the REST façade is responsible for HTTP input data binding, dispatching requests to Enterprise JavaBeans (EJBs) in the network tier of the gatekeeper, marshalling response/exception objects back to the client as a Javascript Object Notation (JSON) string, as well as mapping ParlayX (PX)/EWS exceptions to HTTP response status-code. The network tier can be agnostic to the REST façade. In accordance with an embodiment, the REST façade is available for the following services:

1) Session Manager;
2) PX21: SMS, MMS, terminal location, third party call, call notification, presence;
3) PX30: payment; and
4) EWS: WAP push, Subscriber Profile.

In accordance with an embodiment, the REST façade includes an REST style API that can be employed by client applications to access the telecom network. REST is defined as a set of web service APIs for the management of resources that may be created, read, updated and deleted (CRUD) over hypertext transfer protocol (HTTP). As such, the REST façade implements a resource oriented approach, where each resource is represented by a distinctive URI from its SOAP counter-part. In accordance with an embodiment, the operations on the resource can be mapped to HTTP methods as shown below:

1) GET—retrieve the state of a resource.
   Request: HTTP query string
   Response: 200 (body: JSON representation of a resource), 400, 500.
   Example: get sms delivery status—GET on http://${at.host}:${at.port}/rest/sms/delivery-status/${requestIdentifier}

2) POST—create a new resource without a pre-determined URI. The request URI represents a parent or factory resource. Multiple requests to the same URI may create multiple new resources.
   Request: JSON representation of the resource to be created; content-type: application/JSON
   Response: 201 (header: Location=URI of the new resource if applicable; body: JSON representation of the new resource). 204: (No Content): success with empty body. 400, 500.
   Example: send sms text—POST on http://${at.host}:${at.port}/rest/sms/messages 3) PUT—create a new resource with a predetermined URI. PUT to an existing URI may update the resource.
   Request: JSON representation of response object.
   Response: 201—if new resource is created (response header: location=URI of the new resource if applicable; response body: JSON representation of the new resource). 204: (No Content)—success with empty body. 409: (Conflict) if a resource already exists and it cannot be updated. 400, 500.
   Example: start sms notification—PUT on http://${at.host}:${at.port}/rest/sms/notification
   Example: start geographical terminal location notification—PUT on http://${at.host}:$fat.portyrest/terminal_location/geographical-notification 4) DELETE—delete a resource
   Request: empty body
   Response: 204—(No Content) success with an empty body. 400, 404, 500.
   Example: stop sms notification—DELETE on http://${at.host}:${at.port}/rest/sms/notification/${correlator}

Figure 3:
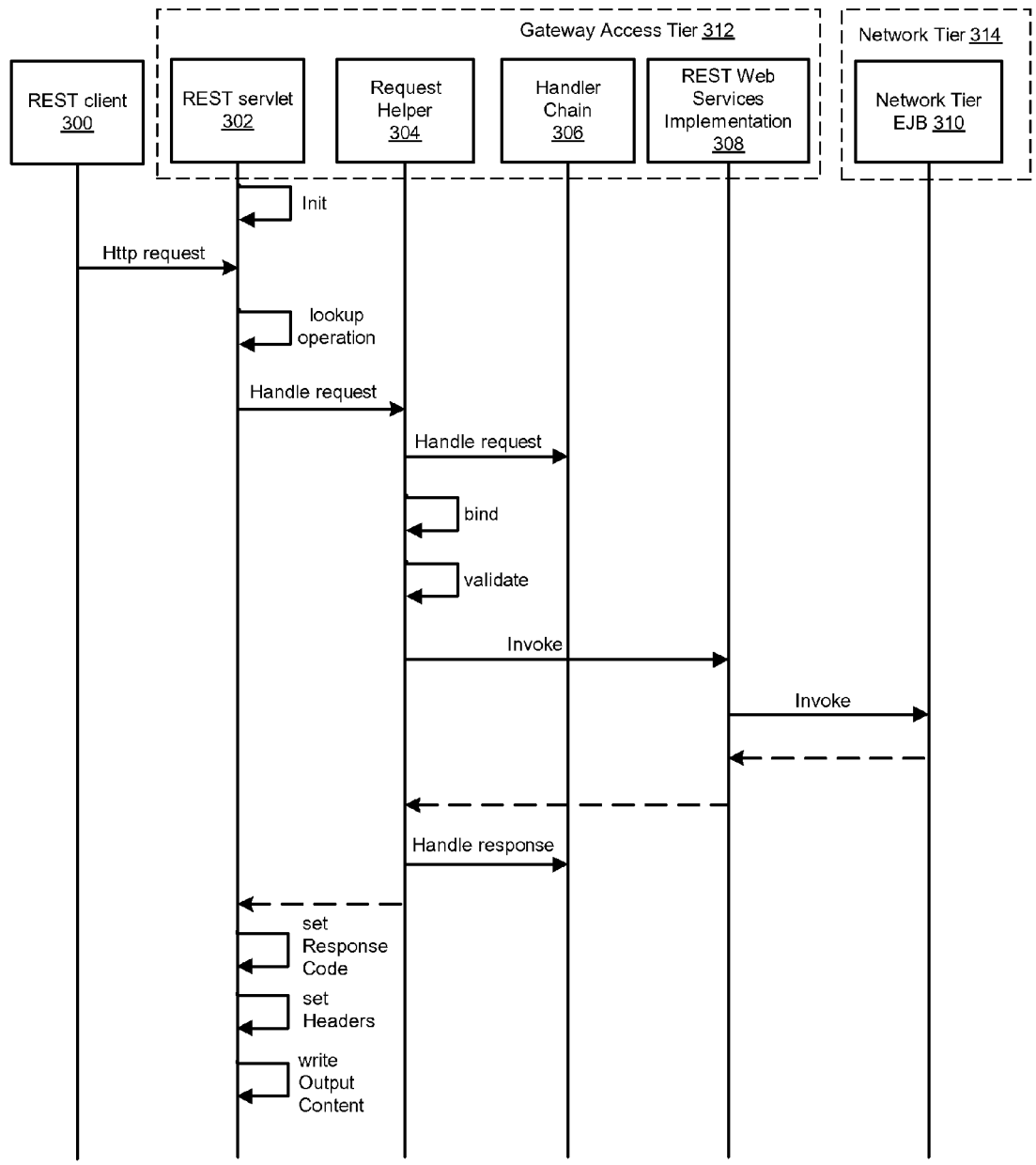
FIG. 3 is an illustration of the use of a REST façade during an application-initiated request, in accordance with various embodiments of the invention.

FIG. 3 is an illustration of the use of a REST façade during an application-initiated request, in accordance with various embodiments of the invention. Illustrated in this figure, the REST façade is used during a request initiated by a client application of the gatekeeper that is using REST web services. The REST client 300 sends an HTTP request to the REST servlet 302 residing in the access tier 312. The REST servlet can perform the necessary lookup and pass the handle to the Request helper 304 and the handler chain 306 which can invoke the REST web services implementation 308. The REST web services implementation can invoke the appropriate EJB 310 in the network tier 314 which forwards the communication to the network resource in the telecom network. In accordance with an embodiment, when the response is passed back to the REST servlet, it sets the response codes, headers and writes the output content for the REST client.

It should be noted that although FIG. 3 shows the implementation of certain objects and components, these objects and components are shown for illustration purposes only and are not necessary required for all implementations of the REST facade. In accordance with various other embodiments, the REST facade can be implemented with different objects and components which do not involve the ones illustrated in FIG. 3.

Figure 4:
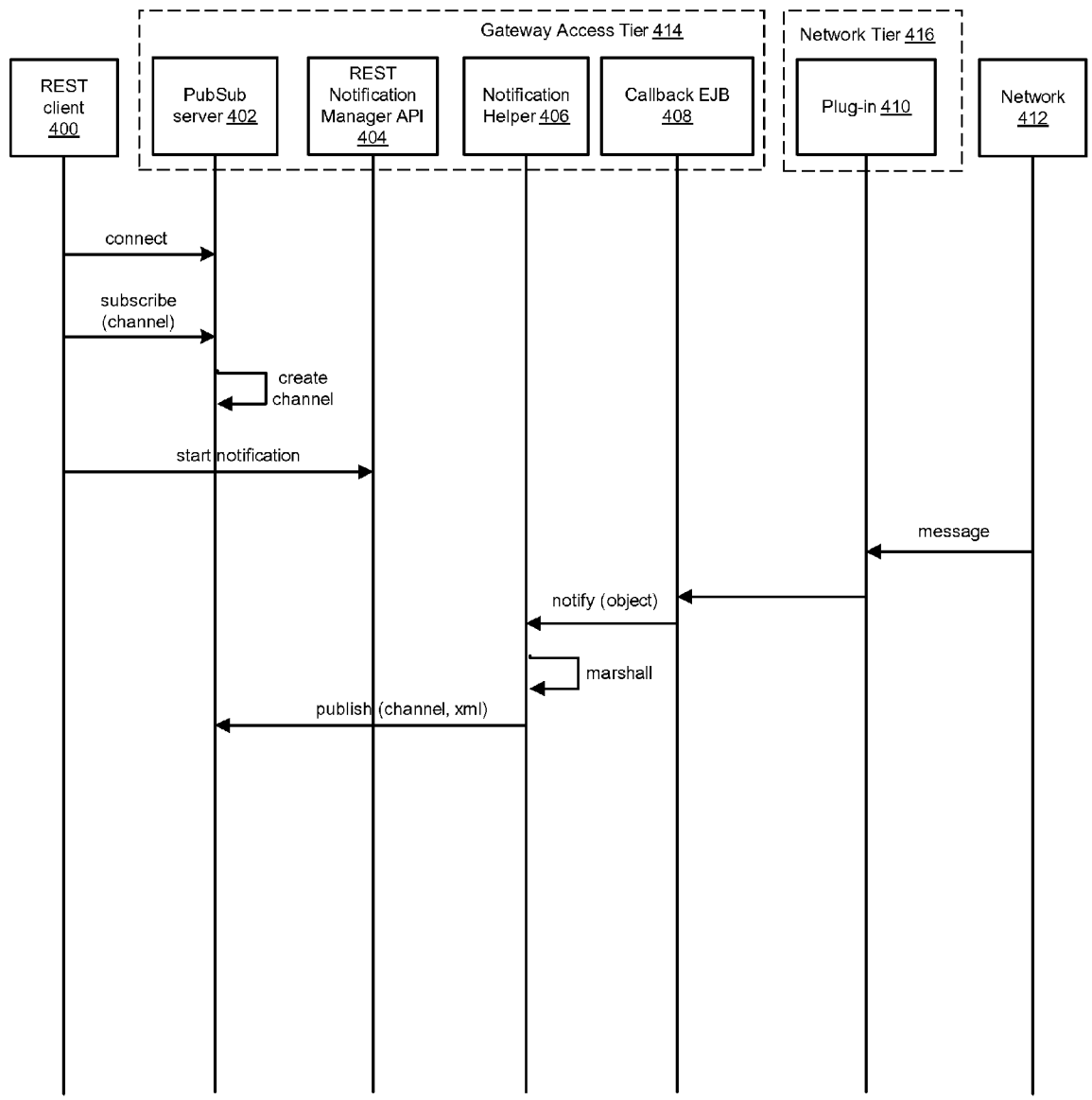
FIG. 4 is an illustration of the REST façade during a network initiated request, in accordance with various embodiments of the invention.

FIG. 4 is an illustration of the REST façade during a network initiated request, in accordance with various embodiments of the invention. As illustrated, the process begins by the REST client 400 connecting to the publication subscription publish/subscribe (PubSub) server 402 component in the gateway access tier 414. The PubSub component 402 can then create a channel for subscription and the client can invoke the REST notification API 404 to subscribe to the channel. Thereafter, when a message originates in the telecom network 412, it can be forwarded to an appropriate plugin 410 in the network tier 416 of the gatekeeper. The network tier then forwards the request to the Callback EJB 408 in the access tier 414, which passes the request to the notification helper 406. The notification helper then marshals the request and publishes the XML description of the message to the PubSub server object 402.

It is noted that similarly to FIG. 3, FIG. 4 also contains certain objects and components which are shown only for purposes of illustration and are not necessarily required for all embodiments involving the REST facade.

SOA Façade

In accordance with various embodiments, the service oriented architecture (SOA) façade provides the ability to integrate the gatekeeper smoothly into a SOA environment by using and leveraging the capabilities of an enterprise service bus that is frequently used by enterprises. A uniform API can be exposed to SOA and non-SOA clients using the service bus. As such, clients of the gatekeeper that are familiar with the interfaces of the service bus can utilize the SOA façade to access the resources of the telecom network.

In accordance with an embodiment, the SOA façade is a server running with the enterprise service bus that interfaces with the network tier of the gatekeeper. The SOA façade can be stateless (similar to the access tier of the gatekeeper as described above). The SOA façade can replace the access tier instances or be used in conjunction with the access tier instances. Therefore, the three deployment options are to deploy the network tier of the gatekeeper with either (1) the SOA façade cluster only, (2) the SOA façade cluster together with the access tier cluster, and (3) the access tier only.

In accordance with an embodiment, the integration of the gatekeeper with the enterprise service bus can minimize any changes in the enterprise service bus code by reusing as many components as possible and by using the same enterprise service bus routing features. In accordance with one embodiment, the service bus is used as a SOAP-to-SOAP proxy which will forward all the requests from the application to the network tier and from the network tier to the application.

Figure 5:
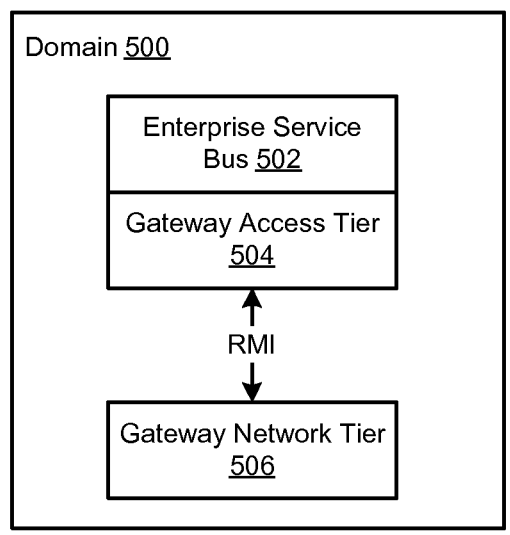
FIG. 5 is an illustration of a possible deployment option for the SOA façade, in accordance with various embodiments of the invention.

FIG. 5 is an illustration of a possible deployment option for the SOA façade, in accordance with various embodiments of the invention. As illustrated, this deployment option implements an enterprise service bus in conjunction with the gatekeeper. The service bus 502 and the access tier 504 are co-deployed in the same server while the network tier 506 can be deployed on another server in the gatekeeper domain 500.

Figure 6:
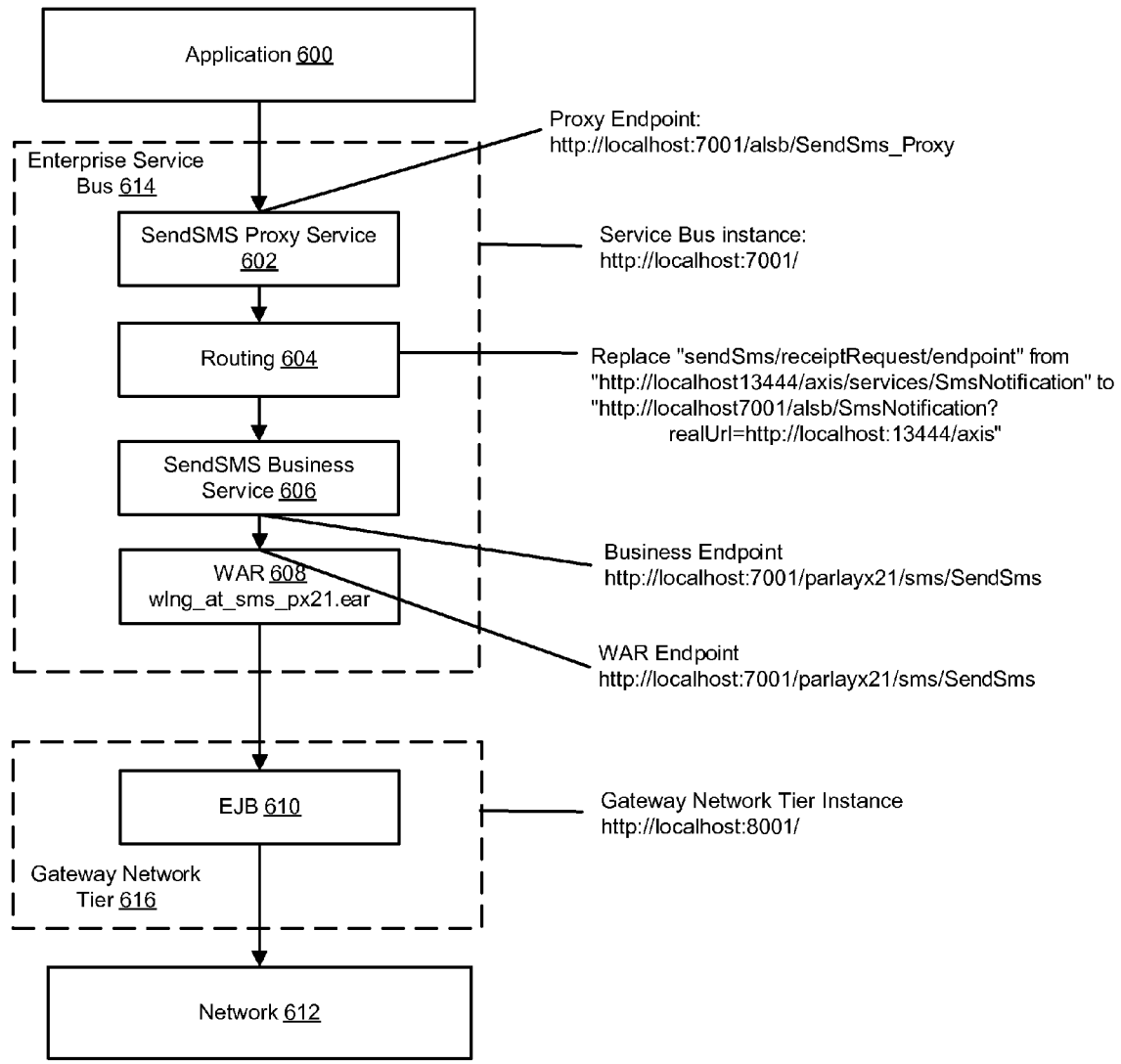
FIG. 6 is an illustration of the SOA façade during an application initiated request, in accordance with various embodiments of the invention.

FIG. 6 is an illustration of the SOA façade during an application initiated request, in accordance with various embodiments of the invention. In particular, this figure illustrates the redirection of the request received by the gatekeeper to flow through the enterprise service bus. For example, when redirected, the flow of an SMS request follows the path: from the client application 600 to the service bus proxy service 602, to the routing component 604, to the service bus business service 606, to the service bus web application archive (WAR) 608 and to the gatekeeper network tier 616, which uses its plugins to route the request on to the telecom network 612.

In accordance with an embodiment, the routing portion of the flow is used to modify any endpoint used to notify the application in order to go through the enterprise service bus again. By default, the notification endpoint usually contains the endpoint of the application itself. If the endpoint were left unmodified, the notification would be forwarded directly to the application, bypassing the service bus. To avoid this from occurring, the service bus will modify the endpoint to redirect it to itself and will store the application endpoint (referred to as the "real" endpoint) in the HTTP query string. In accordance with an embodiment, the modification pattern can be similar to the following:

```
endpoint = [original URL]
modified endpoint = [servicebus URL]?realUrl=[original URL]
```

Figure 7:
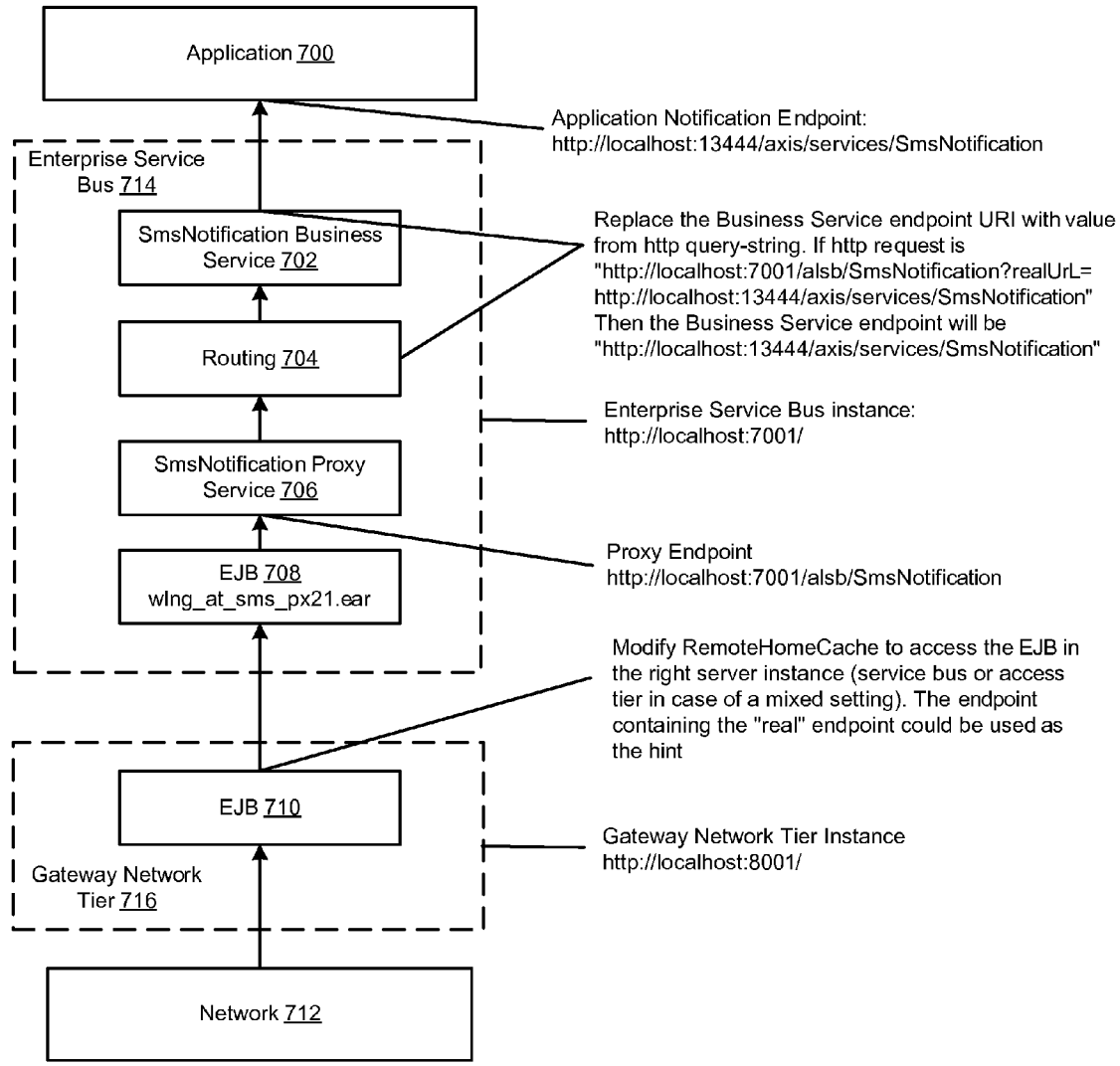
FIG. 7 is an illustration of the SOA façade during a network-initiated request, in accordance with various embodiments of the invention.

FIG. 7 is an illustration of the SOA façade during a network-initiated request, in accordance with various embodiments of the invention. As illustrated, the request originates in the telecom network 712 and flows to an EJB 710 in the gatekeeper network tier 716, which forwards the request to the service bus EJB callback 708 (from the access tier) to the service bus proxy service 706, to the Routing component 704, to the service bus business service 702 and on to the application 700. Similarly to FIG. 6, the "real" endpoint can be stored in the HTTP query string of the request entering the service bus proxy service. The routing can indicate to the business service to use the "real" endpoint as the destination URI using a specific routing option. For example, the HTTP-query string from a notification request might look similar to the following:

```
<http:query-string>
    realUrl=http://localhost:13444/axis/services/SmsNotification
</http:query-string>
```

As illustrated in FIG. 6 and FIG. 7, one implementation for the SOA façade can simply take a request flowing from the network or from the application and reroute it to flow through the enterprise service bus, if one is already deployed. However, this should not be construed to be limiting to the embodiments of the invention. In accordance with alternative embodiments, the SOA façade can be implemented differently, such as creating a separate API for the SOA façade without rerouting the request through the service bus, as well as utilizing other possible implementations.

Native Façade

In accordance with various embodiments, the native façade can provide a way for clients that are already using the native protocols and APIs of the underlying telecom network to continue using those protocols and APIs to access the network capabilities. In addition, these native clients can take advantage of the various additional features provided by the gatekeeper, such as service level agreement (SLA) enforcement, policy evaluation, high availability, scalability, security, and the like. In accordance with an embodiment, when implementing the native façade, there is no need to translate between the format of the application and the network resources since the application is already communicating according to the protocols native to the network. For example, two native protocols that can be supported by the native façade include short message peer-to-peer protocol (SMPP) version 3.4 and Native Multimedia Messaging (MMS) Architecture interface MM7 version 5.3.0. Of course, the native façade embodiments are not limited to these two particular protocols and can support a variety of other native protocols.

Figure 8:
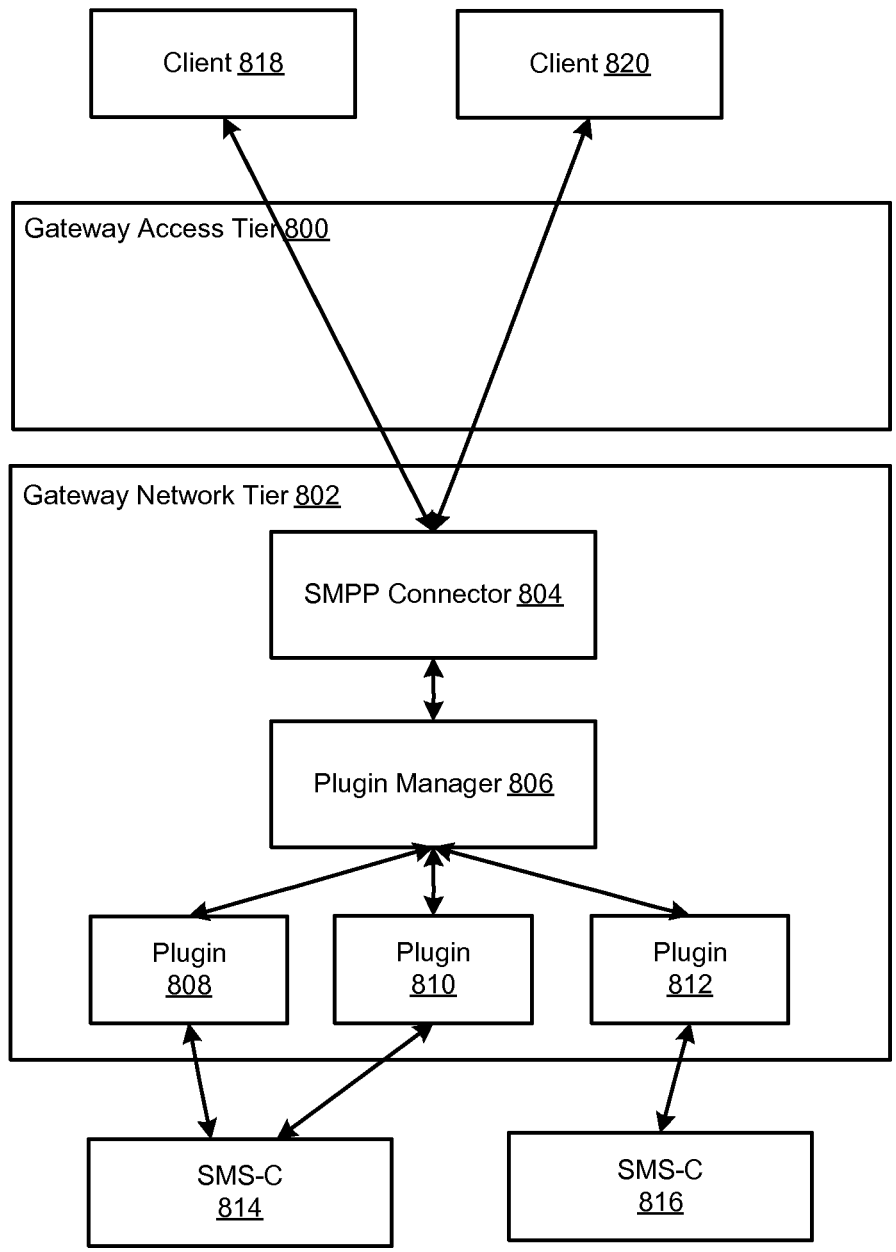
FIG. 8 is an illustration of a native façade having support for native SMPP, in accordance with various embodiments of the invention.

FIG. 8 is an illustration of a native façade having support for native SMPP, in accordance with various embodiments of the invention. The native SMPP connector of the native facade can expose SMPP v 3.4, which is a TCP based short messaging protocol for high performance asynchronous processing. The SMPP connector can support a transmitter, a receiver, and a transceiver. As illustrated, the SMPP connector 804 is hosted on the network tier cluster 802 of the gatekeeper. In accordance with an embodiment, the clients 818, 820 can bind to the network tier server directly, thereby bypassing the need to connect to any access tier components. The SMPP connector can then forward the request to the plugin manager 806 which can select an appropriate plugin 808, 810, 812 that establishes the connection with the resources 814, 816 in the telecom network.

In accordance with an embodiment, native SMPP can be divided into a connector and a plugin. The SMPP connector can replace the access tier functionality and serve as the access point for the client applications. It can accept TCP connections and forward protocol data units (PDUs) between the application and the plugin. The plugin, on the other hand, can connect to the resource in the telecom network (e.g. SMS-C). The plugin can have multiple instances, each instance using a single SMS-C account. The plugin can forward PDUs between the connector and the SMS-C. It can also support multiple binds and be configurable.

Figure 9:
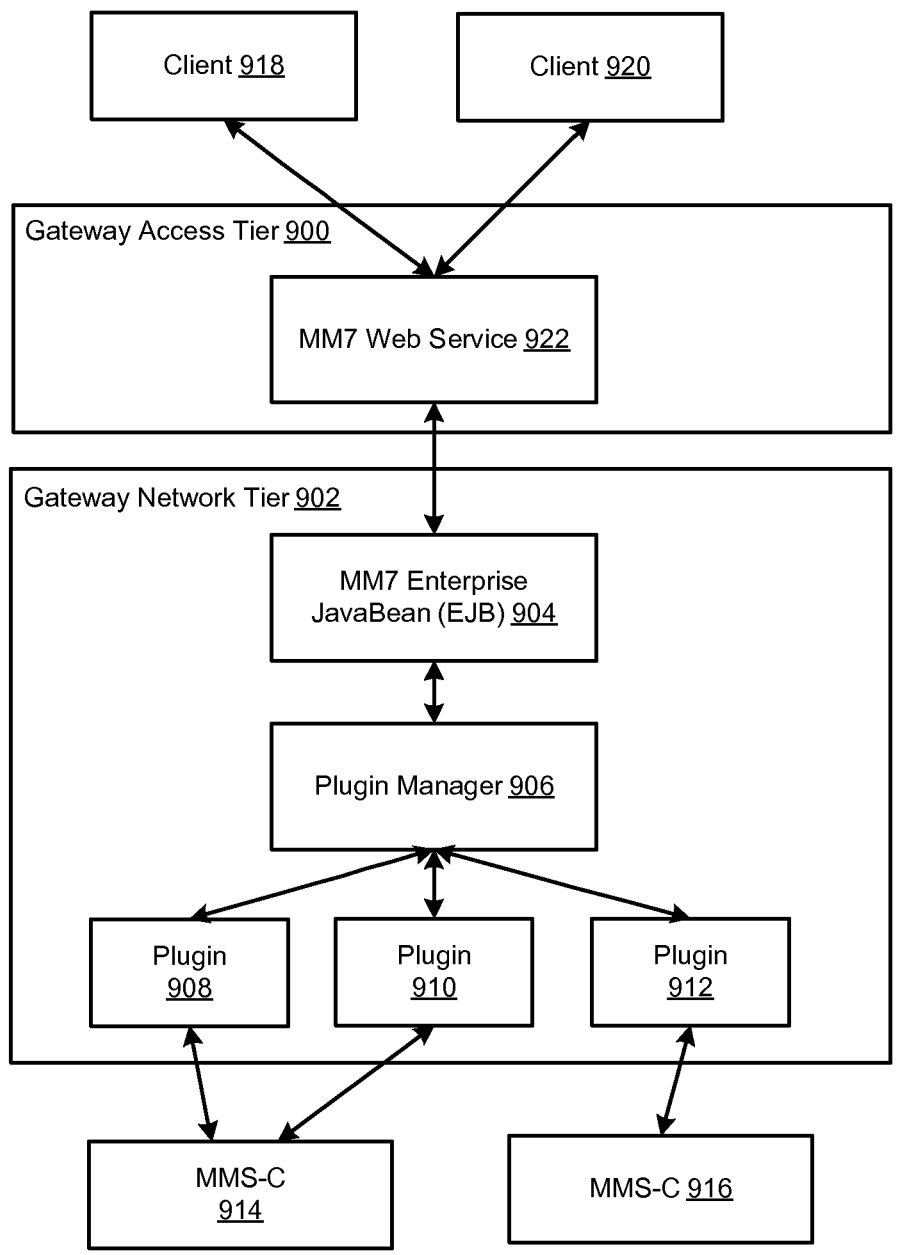
FIG. 9 is an illustration of a native façade having support for native MM7, in accordance with various embodiments of the invention.

FIG. 9 is an illustration of a native façade having support for native MM7, in accordance with various embodiments of the invention. In this illustration, the native facade exposes MM7, which is an HTTP/SOAP based multimedia messaging protocol. In accordance with an embodiment, native MM7 is divided into an access tier EAR 922 and a network tier EAR 904. The MM7 Web Service 922 is deployed in the access tier 900 of the gatekeeper and it serves as the access point to a plurality of client applications 918, 920. The MM7 web service exposes HTTP/SOAP web service and authenticates client applications 918, 920 using HTTP basic authentication. The network tier MM7 EAR 904, on the other hand, contains the EJB and also contains the plugin 908, 910, 912 to establish the connection to the telecom network (e.g. MMS-C 914, 916). The plugin manager 906 can manage the plugins that are used as connections to the various network entities.

Further details and information on the various service facades and other functionality described throughout this disclosure can be found in the U.S. Provisional Patent Application No. 61/294,766, which is incorporated herein by reference in its entirety, including all of the Appendices filed therewith.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for exposing capabilities of an underlying network, said method comprising:

establishing one or more connections via an access tier to a set of resources in a telecommunications network, wherein the set of resources are accessible by a native protocol to perform a set of functions in said telecommunications network;

exposing a plurality of service facades of said set of functions to one or more client applications residing externally with respect to said telecommunications network, wherein each of the service facades is associated with an instance in the access tier and provides a different interface to the client applications for translating invocations via a different protocol to access said set of functions, and wherein each of the service facades performs translation of requests received from the client applications at its interface, for use with said native protocol;

receiving a request from the one or more client applications invoking a particular service facade of said plurality of service facades; and translating the request into said native protocol and routing the request to at least one of the set of resources in the telecommunications network, including invoking, in the access tier, the instance associated with the particular service facade, and performing, by the instance, functions at the network tier, to translate the request.

2. The method of claim 1, wherein the plurality of service facades further include one or more of the following:

a simple object access protocol (SOAP) facade that exposes the functions of said resources in the telecommunications network resources as a set of web services;

a representational state transfer (REST) facade that exposes the functions of said resources in the telecommunications network REST communications;

a native facade that exposes the functions of said network resources in the native protocol of each of said resources; and a service oriented architecture (SOA) facade that exposes the functions of said resources as one or more services accessible on an enterprise service bus.

3. The method of claim 1, wherein the plurality of service facades is deployed on a service access gateway that intercepts communications transmitted to and from the telecommunications network.

4. The method of claim 3, wherein the service access gateway is deployed as an access tier that contains said plurality of service facades, and the network tier includes a plurality of plugins, wherein each plugin establishes a connection to at least one of said resources in the telecommunications network.

5. The method of claim 2, wherein the REST facade further includes an application programming interface that exposes one or more of the following operations:

a get operation that retrieves a state of a resource; a post operation that creates a new resource without a pre-determined uniform resource locator (URL);

a put operation that creates the new resource with the pre-determined URL; and a delete operation that deletes the resource.

6. The method of claim 2, wherein the native facade exposes, to the client applications, one or more of the following native protocols of the resources of said telecommunications network:

a short messaging peer-to-peer protocol (SMPP); and a multimedia messaging service (MMS) MM7 protocol.

7. The method of claim 2, wherein the SOA facade receives application-initiated communications and routes the application-initiated communications to the enterprise service bus; and wherein the SOA facade receives network-initiated communication and routes said network-initiated communications to the enterprise service bus.

8. The method of claim 1, further comprising:

maintaining a record of which service facade was used to receive the request from the client applications, wherein the record is used to route a response to said request over the same service facade.

9. The method of claim 1, further comprising:

dynamically swapping a service facade being used by a client application to a different service facade at runtime, while continuing to maintain uninterrupted service for requests transmitted between the application and the telecommunications network.

10. A system for exposing capabilities of an underlying network, said system comprising:

an access tier which supports one or more connections to a set of resources in a telecommunications network, wherein the set of resources are accessible by a native protocol to perform a set of functions in said telecommunications network;

a plurality of service facades that expose the set of functions to one or more client applications residing externally with respect to said telecommunications network, wherein each of the service facades is associated with an instance in the access tier and provides a different interface to the client applications for translating invocations via a different protocol to access said set of functions, and wherein each of the service facades performs translation of requests received from the client applications at its interface, for use with the native protocol;

wherein a particular service facade of the service facades is used to receive a request from the one or more client applications; and wherein the request is translated into said native protocol and routed to at least one of the set of resources in the telecommunications network, including invoking, in the access tier, the instance associated with the particular service facade, and performing, by the instance, functions at the network tier, to translate the request.

11. The system of claim 10, wherein the plurality of service facades further include one or more of the following:

a simple object access protocol (SOAP) facade that exposes the functions of said resources in the telecommunications network resources as a set of web services;

a representational state transfer (REST) facade that exposes the functions of said resources in the telecommunications network REST communications;

a native facade that exposes the functions of said network resources in the native protocol of each of said resources; and a service oriented architecture (SOA) facade that exposes the functions of said resources as one or more services accessible on an enterprise service bus.

12. The system of claim 10, wherein the plurality of service facades is deployed on a service access gateway that intercepts communications transmitted to and from the telecommunications network.

13. The system of claim 12, wherein the service access gateway is deployed as an access tier that contains said plurality of service facades, and the network tier includes a plurality of plugins, wherein each plugin establishes a connection to at least one of said resources in the telecommunications network.

14. The system of claim 11, wherein the REST facade further includes an application programming interface that exposes one or more of the following operations:

a get operation that retrieves a state of a resource; a post operation that creates a new resource without a pre-determined uniform resource locator (URL);

a put operation that creates the new resource with the pre-determined URL; and a delete operation that deletes the resource.

15. The system of claim 11, wherein the native facade exposes, to the client applications, one or more of the following native protocols of the resources of said telecommunications network:

a short messaging peer-to-peer protocol (SMPP); and a multimedia messaging service (MMS) MM7 protocol.

16. The system of claim 11, wherein the SOA facade receives application-initiated communications and routes the application-initiated communications to the enterprise service bus; and wherein the SOA facade receives network-initiated communication and routes said network-initiated communications to the enterprise service bus.

17. The system of claim 10, wherein a record is maintained of which service facade was used to receive the request from the client applications, wherein the record is used to route a response to said request over the same service facade.

18. The system of claim 10, wherein a client application dynamically swaps a service facade to a different service facade at runtime, while continuing service is continued uninterrupted for requests transmitted between the application and the telecommunications network.

19. A non-transitory computer readable storage medium storing one or more sequences of instructions, said instructions when executed by one or more processors, causing the one or more processors to perform the steps comprising:

supporting, with an access tier, one or more connections to a set of resources in a telecommunications network, wherein the set of resources are accessible by a native protocol to perform a set of functions in said telecommunications network;

exposing a plurality of service facades of said set of functions to one or more client applications residing externally with respect to said telecommunications network, wherein each of the service facade is associated with an instance in the access tier and provides a different interface to the client applications for translating invocations via a different protocol to access said set of functions, and wherein each of the service facades performs translation of requests received from the client applications at its interface, for use with the native protocol;

receiving a request from the one or more client applications invoking a particular service facade of said plurality of service facades; and translating the request into said native protocol and routing the request to at least one of the set of resources in the telecommunications network, including invoking, in the access tier, the instance associated with the particular service facade, and performing, by the instance, functions at the network tier, to translate the request.

\* \* \* \* \*

UNITED STATES PATENT AND TRADEMARK OFFICE
CERTIFICATE OF CORRECTION

PATENT NO. : 8,605,667 B2  
APPLICATION NO. : 13/006153  
DATED : December 10, 2013  
INVENTOR(S) : Rajasekar et al.

Page 1 of 1

It is certified that error appears in the above-identified patent and that said Letters Patent is hereby corrected as shown below:

In the Specification

In column 4, line 2, delete "assessor" and insert -- accessor --, therefor.

In column 6, line 41, delete "$fat.portyrest" and insert -- ${at.port}/rest --, therefor.

Signed and Sealed this
Fifteenth Day of July, 2014

Michelle K. Lee
*Deputy Director of the United States Patent and Trademark Office*